(12) United States Patent
Thunes et al.

(10) Patent No.: US 7,034,501 B1
(45) Date of Patent: Apr. 25, 2006

(54) ADJUSTING GATE PULSE TIME INTERVALS FOR REFLECTED WAVE MITIGATION

(75) Inventors: Jerry D. Thunes, Greenfield, WI (US); Russel J. Kerkman, Milwaukee, WI (US); Takayoshi Matsuo, Brown Deer, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/068,351

(22) Filed: Feb. 28, 2005

(51) Int. Cl.
*H02P 5/17* (2006.01)

(52) U.S. Cl. .................. 318/812; 318/810; 318/811

(58) Field of Classification Search ............... 318/812, 318/810, 811
See application file for complete search history.

(56) References Cited

U.S. PATENT DOCUMENTS

| | | | |
|---|---|---|---|
| 3,596,158 A * | 7/1971 | Watrous | 318/809 |
| 4,611,158 A * | 9/1986 | Nagase et al. | 318/803 |
| 4,720,777 A * | 1/1988 | Yokoi | 363/41 |
| 4,722,042 A * | 1/1988 | Asano et al. | 363/98 |
| 5,587,891 A * | 12/1996 | Nakata et al. | 363/41 |
| 5,912,813 A * | 6/1999 | Kerkman et al. | 363/98 |
| 5,990,654 A | 11/1999 | Skibinski et al. | 318/800 |
| 6,014,497 A * | 1/2000 | Kerkman et al. | 388/811 |
| 6,324,085 B1 * | 11/2001 | Kimura et al. | 363/132 |
| 6,541,933 B1 * | 4/2003 | Leggate et al. | 318/599 |

* cited by examiner

*Primary Examiner*—Rita Leykin
(74) *Attorney, Agent, or Firm*—Quarles & Brady, LLP; William R. Walbrun (57) ABSTRACT

Methods and apparatus for controlling switching in a DC-to-AC inverter to prevent overvoltages applied to an AC motor by determining the switching order of the phase voltage signals, providing gating signals at switching intervals by modulating a carrier wave with the phase voltage signals, comparing the switching intervals to a predetermined minimum time interval sufficient for reflected wave transients to dissipate, and adjusting the switching intervals to be at least equal to the predetermined minimum time interval.

15 Claims, 8 Drawing Sheets

ADJUSTING GATE PULSE TIME INTERVALS FOR REFLECTED WAVE MITIGATION

CROSS-REFERENCE TO RELATED APPLICATIONS

NOT APPLICABLE

STATEMENT REGARDING FEDERALLY SPONSORED RESEARCH

NOT APPLICABLE

TECHNICAL FIELD

The field of the invention is control systems for controlling the operation of AC motors.

BACKGROUND ART

A well known type of AC drive includes an AC-to-DC converter for converting three-phase AC source voltages to DC voltages on a DC bus. The DC bus interfaces the AC-to-DC converter to a DC-to-AC inverter, which is typically a three-phase bridge network of solid state switches, which are switched at high frequency to generate pulse width modulation (PWM) or other types of modulated low frequency power signals which are supplied to an AC motor. Under certain operating conditions, these systems experience overvoltages due to transient waves that are reflected waves along the power lines between the motor and the control system.

One way of mitigating these reflected waves is to place chokes and passive filter components in the lines between the motor and the inverter as disclosed in Skibinski et al., U.S. Pat. No. 5,990,654. This increases the number of components, however, as well as increasing manufacturing costs.

Other solutions for high speed operation have involved monitoring overvoltage conditions and altering modulating signals which in turn control firing signals provided to the inverter switching devices. In Kerkman et al., U.S. Pat. No. 5,912,813, modulating waves are altered by tying them to the positive or negative DC bus and by limiting their magnitude in situations which would cause an overvoltage. Further developments of this basic approach are provided in Leggate et al., U.S. Pat. No. 6,541,933.

In Kerkman et al., U.S. Pat. No. 6,819,070, initial firing pulse characteristics are identified and then compared to pulse characteristics known to cause an overvoltage. The initial firing pulse is then altered so as not to cause overvoltage, and an accumulated error corresponding to the altered firing pulse is identified. The firing pulse following the altered firing pulse is modified as a function of the accumulated error to generate a composite firing pulse, and the process of identifying, comparing and altering, is repeated for subsequent firing pulses.

In Kerkman et al., U.S. Pat. No. 6,014,497, a dwell time is calculated based on certain parameters of the power lines to determine the voltages to produce in the inverter without causing overvoltages.

Other known methods implement a minimum dwell time at high motor speeds by eliminating narrow pulses near the peak and valley of the modulator as transitions into or out of overmodulation occur. One method basically drops narrow pulses when the pulse time becomes less than the required dwell time.

Although voltage polarity reversals and double pulsing are most likely at high modulation indexes (i.e. high motor speeds), voltage polarity reversals can occur throughout the operating region of the inverter. In general, such events occur when phase current is within a threshold of current polarity reversal during the dead time interval. These conditions exist in applications during low speed operation. When the motor speed is low, the applied motor voltage is also typically low and the three motor voltage phases are nearly the same magnitude and provide nearly 50% duty cycles out of the modulator. The motor power factor is also nearly 1.0. An uncontrolled region of operation occurs where the current changes polarity, where currents exist due to parasitic capacitances and where traveling wave conditions exist. In this region, uncontrolled voltage double pulsing and polarity reversals can occur. This uncontrolled region corresponds to the dead time region of the inverter. The end result is greater than two times source voltage at the motor.

SUMMARY OF THE INVENTION

The present invention relates generally to methods for reducing or mitigating the effects of reflected waves in a converter/inverter variable frequency drive system. This is accomplished by enforcing a minimum time interval between gate pulses for the respective phases sufficient for reflected wave transients to dissipate.

This enforced minimum time interval allows motor voltage ringing associated with a first power transistor (IGBT) gate pulse to decay before the next phase is allowed to switch. This, in turn, prevents an IGBT from turning on at peak motor terminal voltage. Motor voltages resulting from IGBT gate pulses become additive often exceeding two times source voltage, however by enforcing a minimum interval, greater than two times source voltage can be effectively controlled to a value approximately equal to twice source voltage.

The invention also reduces or mitigates the effects of inverter-induced polarity reversals, which is an inverter-driven event occurring most often when at least two phase signals intersect at a specific point in time. If not compensated, this results in 200% of bus voltage being applied when switching to the opposite side of the DC bus.

In the method of the invention, a check is made of the anticipated time difference between gate pulses and if there is less than a given minimum time interval, the switching is modified and a minimum interval is enforced. If sufficient time is available, gate pulses that occur too close together are separated equally with reference to a mid-point. If sufficient time is not available, then the first and or last gate pulse is respectively advanced or delayed to provide the required minimum time interval.

With the invention it is possible to reduce peak voltage at the motor by more than 300 volts when the minimum time interval is enforced at low motor speeds. Specifically the motor peak voltage can be dropped from over 1850 volts to less than 1550 volts with a 725 volt bus.

The invention will enable one to reduce the peak-to-peak motor voltage at lower speeds using a lower cost solution than the prior art.

These and other objects and advantages of the invention will be apparent from the description that follows and from the drawings which illustrate embodiments of the invention, and which are incorporated herein by reference.

DETAILED DESCRIPTION OF THE PREFERRED EMBODIMENTS

Figure 1:
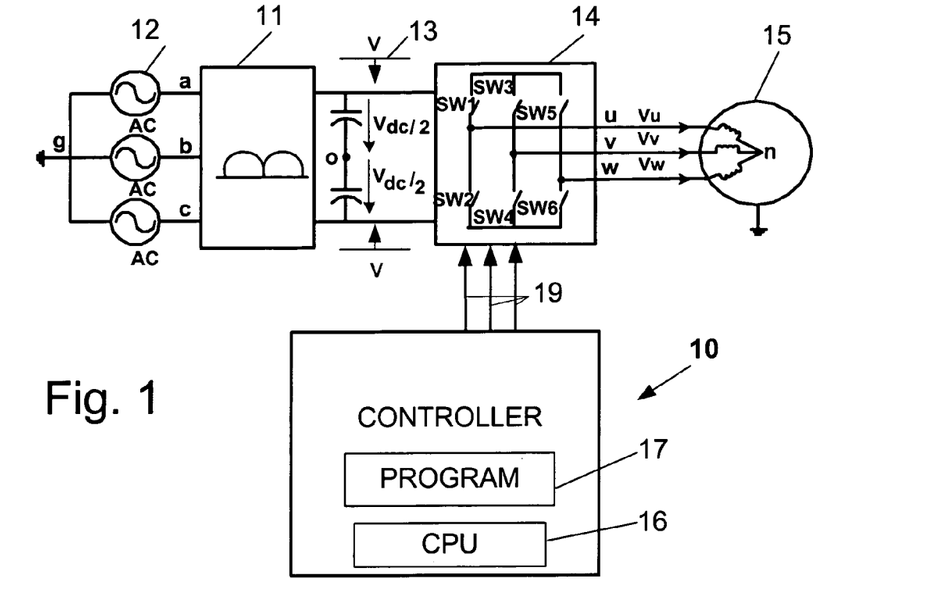
FIG. 1 is a block diagram of a motor drive for practicing the methods of the present invention.

FIG. 1 illustrates a block diagram of an AC drive controller 10 for controlling an AC-to-DC converter 11 for converting three-phase AC source voltages from an AC voltage supply 12 to DC voltages, $V_{dc}$, on a DC bus 13. The DC bus 13 interfaces the AC-to-DC converter 11 to a DC-to-AC inverter 14, which is typically a three-phase bridge network of solid state switches SW1—SW6, preferably IGBT's, which are switched at high frequency to generate pulse width modulation (PWM) or other types of modulated low frequency power signals Vu, Vv, Vw, which are supplied to an AC motor 15.

The controller 10 includes a microelectronic CPU 16 operating according to instructions in a control program 17 stored in memory. The program 17 includes instructions for performing regulation of a DC bus voltage and regulation of current supplied to the motor 15. The controller provides gating signals through outputs 19 to control the switching of the switches SW1—SW6 in the inverter 14.

Figure 2:
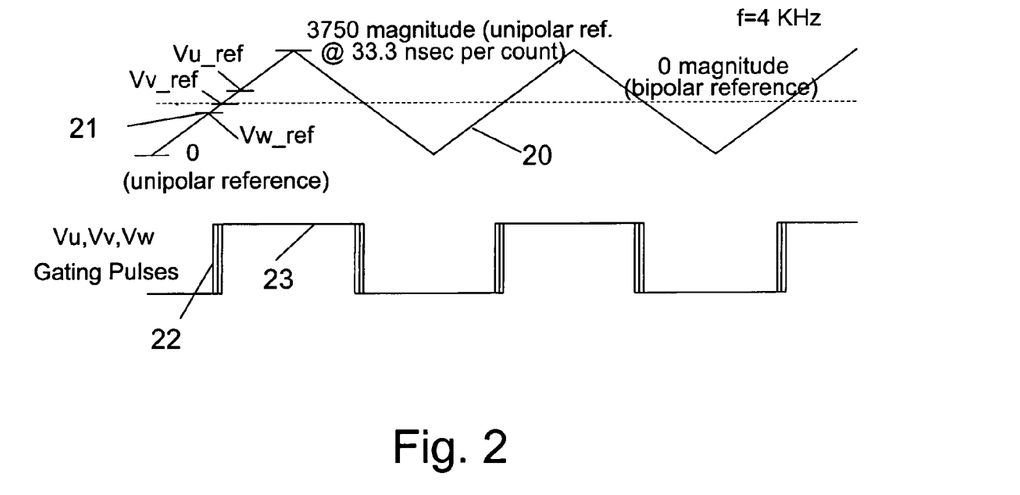
FIG. 2 shows PWM modulation using a triangular carrier wave.

FIG. 2 shows a triangular carrier wave 20 which is modulated by phase reference voltage commands, $V_{u\_ref}$, $V_{v\_ref}$ and $V_{w\_ref}$ by detecting respective points of intersection 21 of the phase reference voltage commands and the carrier wave 20 that define the rising edges 22 of gating pulse signals 23. The resulting pulse signals 23 are seen in FIG. 2. It can be seen that with small adjustments in advancing or delaying the rising edge 22 that the interval between gate pulses 23 can be adjusted.

Figure 13A:
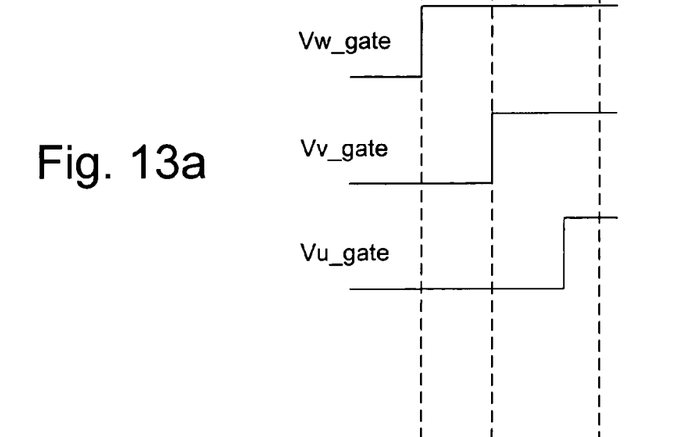
FIGS. 13a–13c are diagrams of phase and line-to-line gating signals vs. time showing the problem of voltage pulsing due to current reversal during a dead band time.
Figure 13B:
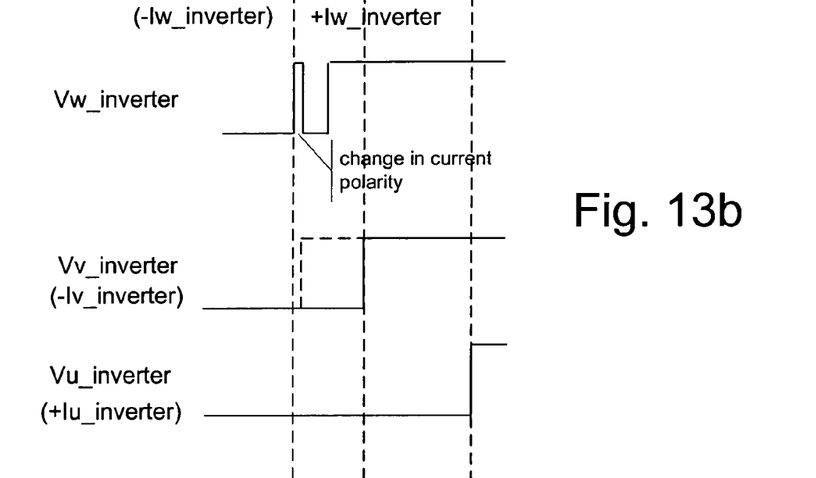
Figure 13C:
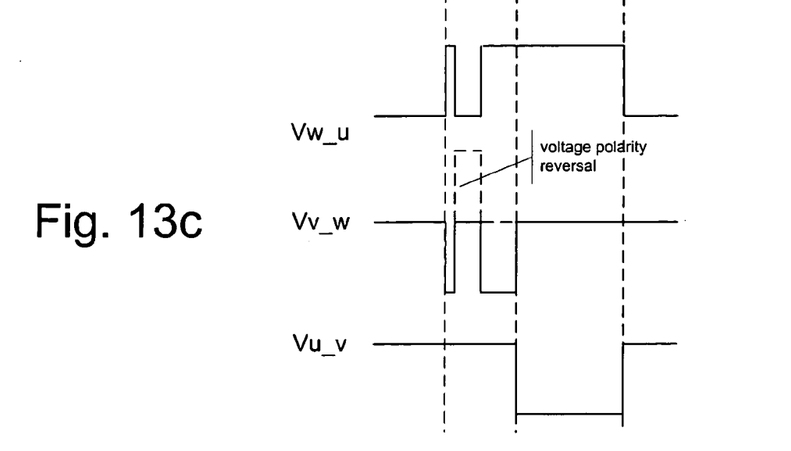
Figure 13D:
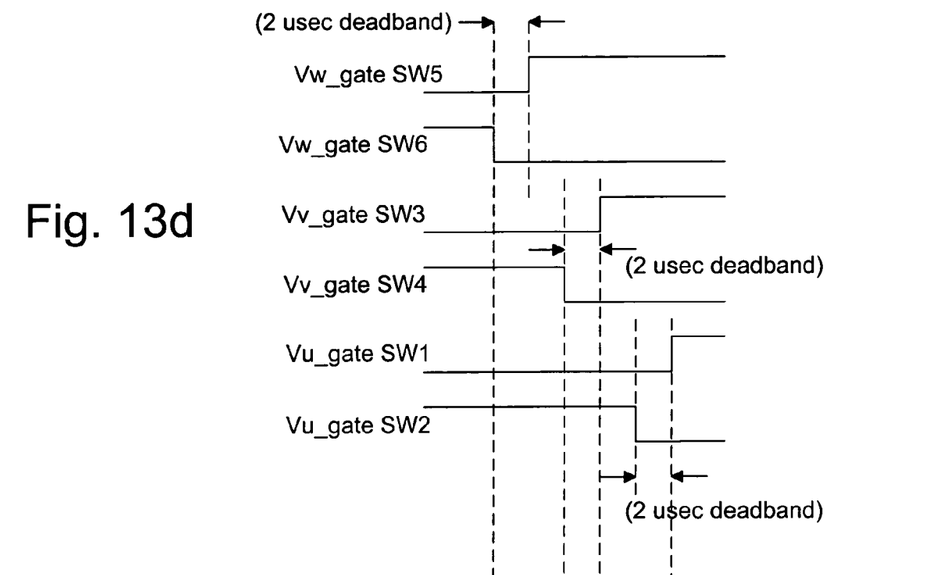
FIGS. 13d–13f are diagrams of phase gating signals vs. time showing the provision of minimum dead band time for switching in each phase of the inverter.
Figure 13E:
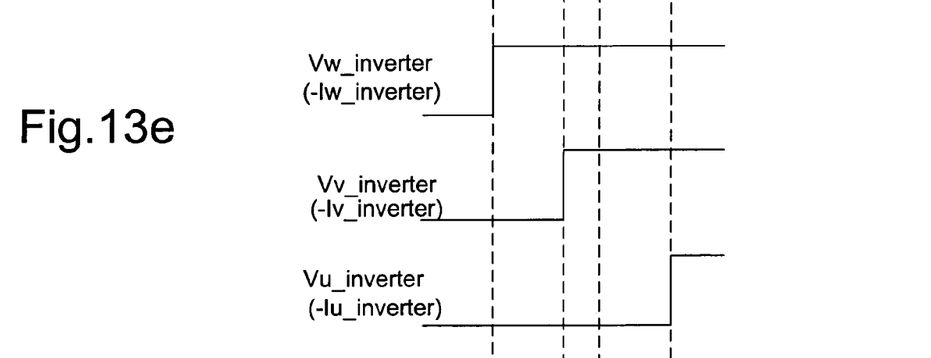
Figure 13F:
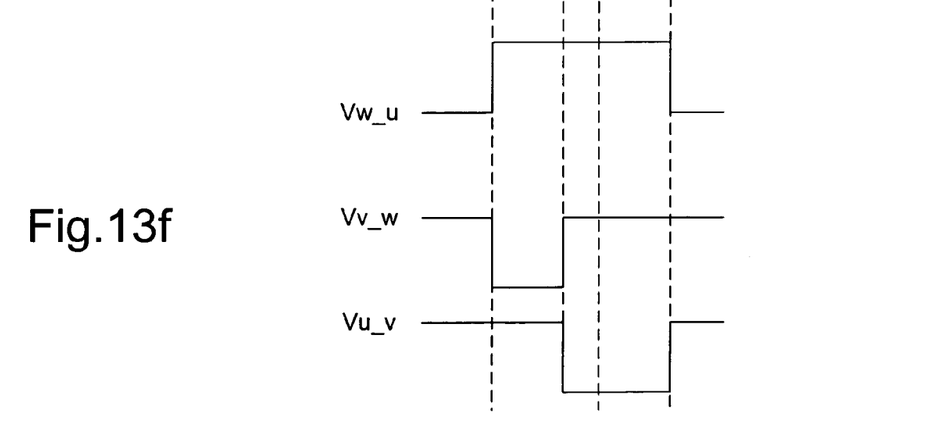

Referring to FIG. 13a, the intersection of the phase reference voltage commands Vw_ref, Vv_ref and Vu_ref with the carrier wave 20 of FIG. 2 produce gate signals Vw_gate, Vv_gate and Vu_gate. Normally, only one switch SW1—SW6 in each leg of the inverter 14 is conducting. When a switch SW1—SW6 in one leg is to be turned off and a switch SW1—SW6 in the same leg is to be turned on, a dead band is applied as shown in FIG. 13d. The dead band allows a sufficient amount of time for the switch to be turned-off to stop conducting before the switch to be turned on is commanded on. During the dead band time the state of the switch is uncontrolled and determined by the polarity of the phase current as shown in FIGS. 13e and 13f. During the uncontrolled state the current through a motor phase can reverse polarity from its normal polarity and create double pulsing as represented for phase W in FIG. 13b. If the V phase inverter voltage changes during a double pulse on phase W this can result in a voltage polarity reversal and a line-to-line voltage Vv_w of at least twice the DC bus voltage as shown with the dotted line in FIGS. 13b and 13c.

To reduce or mitigate the effects of this type of double voltage pulsing a minimum time interval is enforced as shown in FIGS. 3 to 8b. FIG. 13d shows the pairs of upper and lower gate signals for each phase with a 2-microsecond dead band. As an example for on of the legs, the 2-microsecond dead band is allowed for the device SW6 to actually stop carrying current before the opposite device SW5 is turned on. If the upper device SW5 is turned on before the lower switch SW6 actually stops carrying current, then conduction can occur from the upper device directly to the lower device without going through the motor (shoot-through). FIG. 13e shows the inverter voltage and current for the respective phases, W, V and U where there is no current reversal due to the dead band seen in FIG. 13d. FIG. 13f shows the line-to-line voltages Vw_u, Vv_w and Vu_v, and shows that one line-to-line voltage is always of an opposite state from the other two line-to-line voltages.

Voltage polarity reversals can also occur as a result of ringing associated with reflected waves. These reflected waves are reflected back from the motor to the inverter and result from high frequency transients in the power signals supplied to the motor. This can occur throughout the motor operating speed and torque range and is specifically seen at low motor speeds. Forcing a separation between switching events provides time for the ringing of a switching event to damp out before another switching event is allowed. When the speed of the motor 15 is low, the applied motor voltage is also typically low and the three motor voltage commands, $V_{u\_ref}$, $V_{v\_ref}$ and $V_{w\_ref}$ are nearly the same magnitude, and provide nearly 50% duty cycles out of the modulator. The motor power factor is also nearly 1.0. When the current crosses a threshold where its polarity can reverse because of high frequency, currents associated with parasitic capacitance and traveling wave conditions exist which lead to uncontrolled voltage double pulsing and potential polarity reversals. This uncontrolled region corresponds to the dead time region of the inverter. This can result in greater than twice the source voltage applied at the motor.

One method of preventing these events is the enforcement of a minimum time interval to compensate for reflected waves. If sufficient time is allowed between gate pulses, the ringing associated with a gate pulse will decay and a subsequent gate pulse will not occur at the peak voltage caused by a previous gate pulse.

Figure 3:
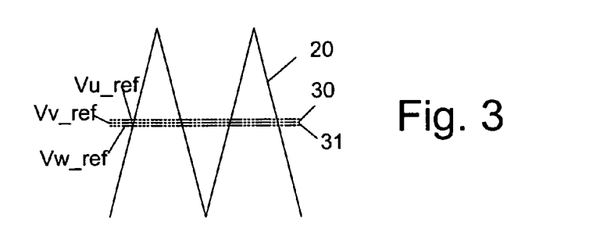
FIG. 3 shows PWM modulation where all three of the modulating waves are too close together to produce the necessary time intervals between gating pulses.
Figure 4:
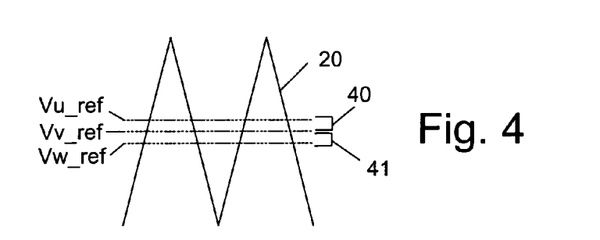
FIG. 4 shows PWM modulation with the modulating waves further apart to increase the time interval between gating pulses.
Figure 5A:
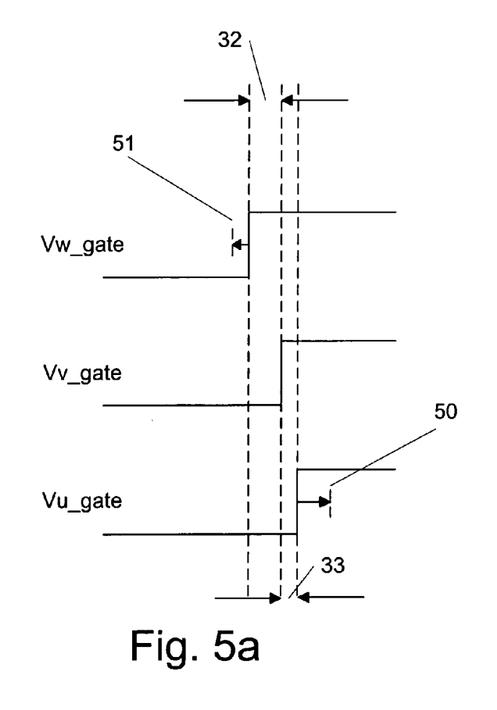
FIGS. 5a and 5b shows the gating pulses resulting from FIGS. 3 and 4, respectively.
Figure 5B:
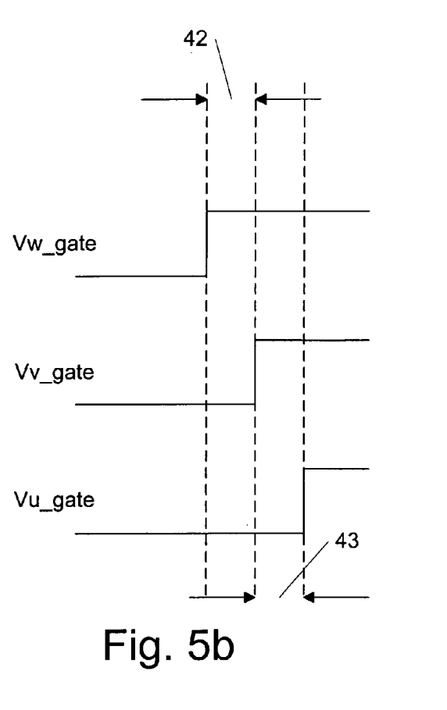

Referring next to FIG. 3, the voltage commands, $V_{u\_ref}$, $V_{v\_ref}$ and $V_{w\_ref}$ are seen as they intersect the triangular carrier wave 20. It has been determined that the voltage commands $V_{u\_ref}$, $V_{v\_ref}$ and $V_{w\_ref}$ are too close together in time, as shown by time gaps 30 and 31, so as produce time intervals 32 and 33 in FIG. 5*a* that are less then fifteen microseconds each. The objective of the invention is shown in FIGS. 4 and 5, where, in effect, both the minimum and maximum voltage commands, $V_{u\_ref}$ and $V_{w\_ref}$ have been moved further away from voltage command, $V_{v\_gate}$, to produce larger time differences 40, 41 in FIG. 4, which would in turn produce larger minimum time intervals 42, 43 in FIG. 5*b*. These time intervals are at least a minimum time interval, which for the sake of this example is fifteen microseconds. In other examples to be discussed below the amount might be less such as six microseconds or some other interval. The interval is dependent on features of the wiring connecting the drive to the motor, and to a lesser extent on characteristics of a particular drive or motor and is developed through test results for a particular configuration.

In FIG. 5*a*, the rising edge of the gate pulse, $V_{u\_gate}$, has been delayed by an interval 50 of ten microseconds to produce time interval 43 of fifteen microseconds between gate pulses in FIG. 5*b*. The rising edge of the gate pulse, $V_{w\_gate}$, for phase W has been advanced by an interval 51 of five microseconds in FIG. 5*a*, to produce a minimum time interval 42 of fifteen microseconds to the rising edge of the $V_{v\_gate}$ pulse in FIG. 5*b*.

Figure 6:
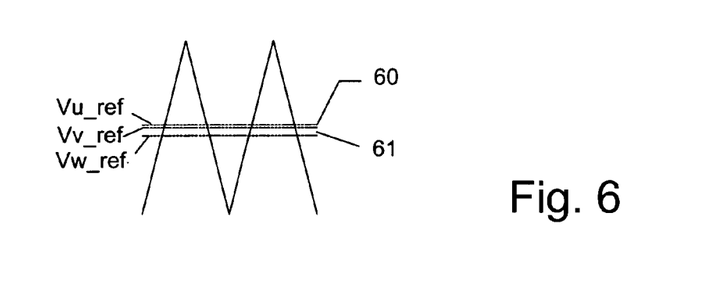
FIG. 6 shows PWM modulation in a second example where phase voltages for two phases are too close together to produce a necessary time interval between gating pulses.
Figure 7:
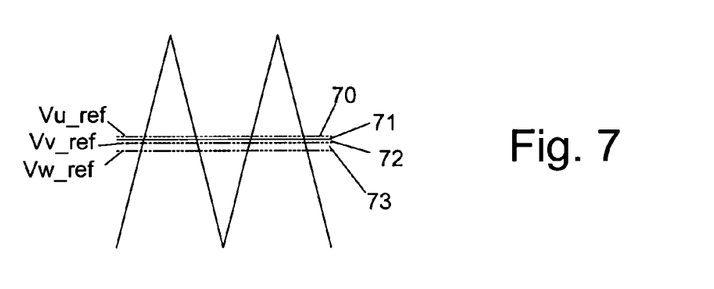
FIG. 7 shows PWM modulation with a modification to the phase voltages in FIG. 6.
Figure 8A:
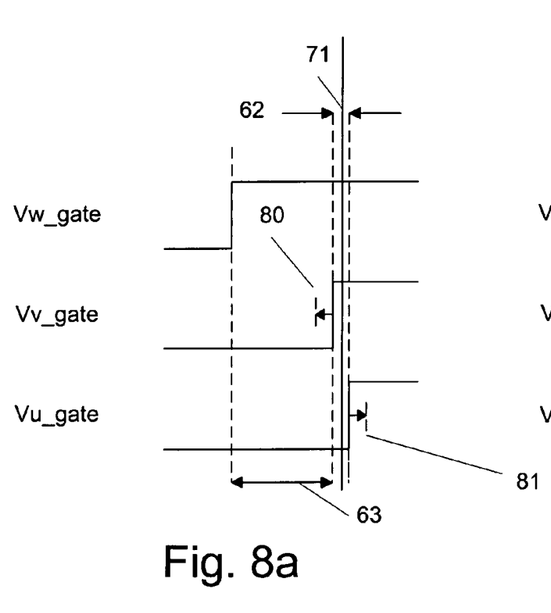
FIGS. 8a and 8b show the gating signals resulting from the modulation depicted in FIGS. 6 and 7, respectively.
Figure 8B:
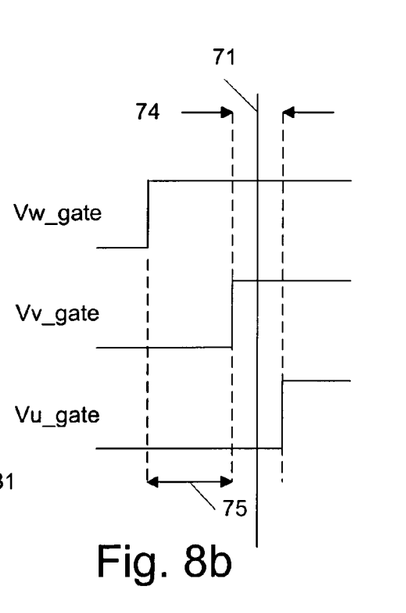

FIG. 6 shows a second example in which two of the phase voltages $V_{u\_ref}$ and $V_{v\_ref}$ have a difference that produces a time interval 62 between the respective gate pulses, $V_{u\_gate}$ and $V_{v\_gate}$ that is less than fifteen microseconds. However, the two phase voltages $V_{v\_ref}$ and $V_{w\_ref}$ have a difference that is sufficient to produce more than a 15-microsecond minimum time interval 63 between the respective gate pulses, $V_{v\_gate}$ and $V_{w\_gate}$. As seen in FIG. 7, another objective of the invention is to increase the time gap 70, 72 between phase voltage commands, $V_{v\_ref}$ and $V_{w\_ref}$ without reducing the time gap 73 between phase voltage commands $V_{v\_ref}$ and $V_{v\_ref}$ so as to reduce the time interval 63 between $V_{v\_gate}$ and $V_{w\_gate}$ to something less than fifteen microseconds. As seen in FIG. 8*a*, this is accomplished by advancing the rising edge of the gating pulse $V_{v\_gate}$ for phase "v" by a time interval 80 and delaying the rising edge of the gating pulse $V_{u\_gate}$ for phase "u" by a time interval 81 relative to a mid-point 71, to provide new intervals 74, 75 which are each at least fifteen microseconds.

Figure 9:
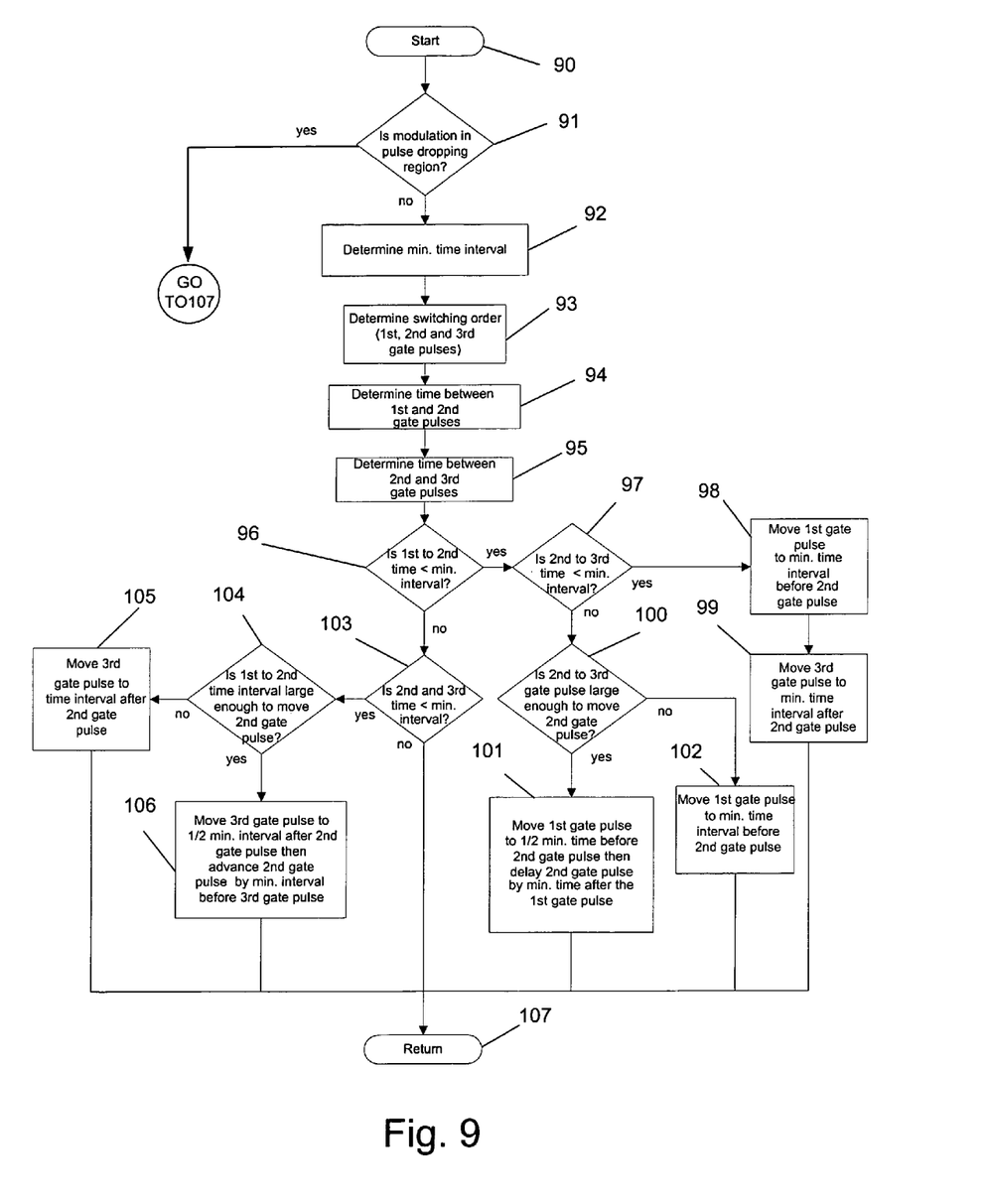
FIG. 9 is a flow chart of a program routine for carrying out the present invention.

One example of a program routine to carry out the corrections, is seen in FIG. 9, where the relative timing of the gate pulses is checked and if there is less than a given minimum time interval, the time interval is modified and a minimum time interval is enforced. If sufficient time is not available, then the first and/or last gate pulse is advanced or delayed, respectively, to provide the required minimum time interval shown in FIGS. 5*a* and 5*b*. If sufficient time is available, the gate pulses that are too close are separated equally about a mid-point as illustrated in FIGS. 8*a*. and 8*b*.

Referring to FIG. 9, the start of the routine is represented by start block 90. The blocks each represent one or more program instructions. A decision block 91 is then executed to check whether the drive controller 10 is operating in the pulse dropping region. If the answer is "yes," the present routine is skipped and a return is made to main program through return block 107. Assuming that modulation is not being executed in the pulse dropping region, a required time interval is determined based on engineering design testing and PWM carrier frequency selection, as represented by process block 92. Next, the order of switching of the phases is determined, as represented by process block 93. Next, the time between the first and second gate pulses (rising edges of the gate pulse signals) is determined as represented by process block 94. Then, the time between the second and third gate pulses is determined as represented by process block 95.

The routine then proceeds to compare the differences in gate pulses to the required minimum time interval, beginning in decision block 96, where the difference between the first and second gate pulses is compared to the minimum time interval. If the answer is "yes," as represented by the "yes" branch from decision block 96, then the routine proceeds to decision block 97 to determine if the difference between the second and third gate pulses is less than the minimum time interval. If the answers are "yes" and "yes" in decision blocks 96 and 97, the first and third gate pulses will be adjusted in process blocks 98 and 99 as seen in FIG. 5. If the answers are "yes" and "no" in decision blocks 96 and 97, respectively, then the routine checks the difference between the second and third gate pulses, to see if the second event can be adjusted, as represented by decision block 100. If so, then the first gate pulse is moved to ½ the minimum time interval in advance of a mid-point and the second gate pulse is delayed to ½ the minimum time interval after the mid-point as represented by process block 101 and as illustrated in FIG. 8. If the answer in executing decision block 100 is "no," then the routine proceeds to process block 102 where the first gate pulse is simply moved in advance of the second gate pulse by the minimum time interval.

If the answer is "no," as represented by the "no" branch from decision block 96, then the routine proceeds to decision block 103 to determine if the difference between the second and third gate pulses is less than the minimum time interval. If the answer in decision block 103 is "no," then time intervals are sufficient and the routine returns to main program through return block 107. If the answer in decision block 103 is "yes," then either the second or third gate pulse must be moved as determined by executing decision block 104, followed by either process block 105 or process block 106. In process block 105, the third gate pulse is moved to the minimum time interval after the second gate pulse. In process block 106, the third gate pulse is moved to ½ the minimum time interval after the second gate pulse and the second gate pulse is moved to the minimum time interval before the third gate pulse and the routine returns to the main program through return block 107. This routine demonstrates only one of many implementations that could determine the relative timing between the gate pulses and adjust the gate pulse times to enforce a minimum time interval.

Figure 10:
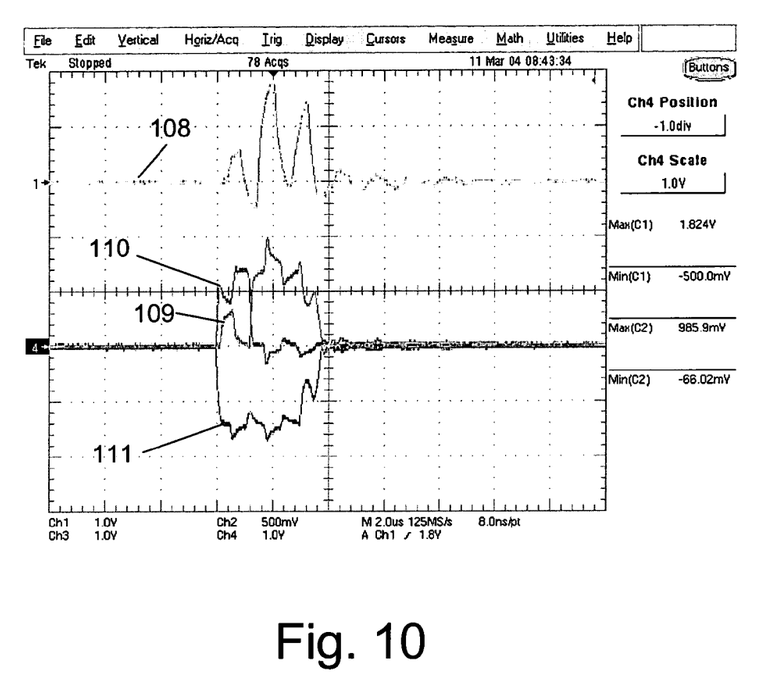
FIGS. 10–12 are graphs of motor voltage vs. time comparing motor performance without enabling the method of the present invention (FIGS. 10 and 11) and after enabling the present invention (FIG. 12)

FIG. 10 shows individual phase voltages 109, 110 and 111, ($V_{u\_motor}$, $V_{v\_motor}$ and $V_{w\_motor}$) and a line-to-line peak voltage 108 ($V_{u\_w}$) without using the program routine of the present invention. The switching pulses have a duty cycle of approximately 50%. Two gate pulses that occurred about 1 microsecond apart resulted in a line-to-line peak voltage 108 ($V_{u\_w}$) of 1824 volts.

Figure 11:
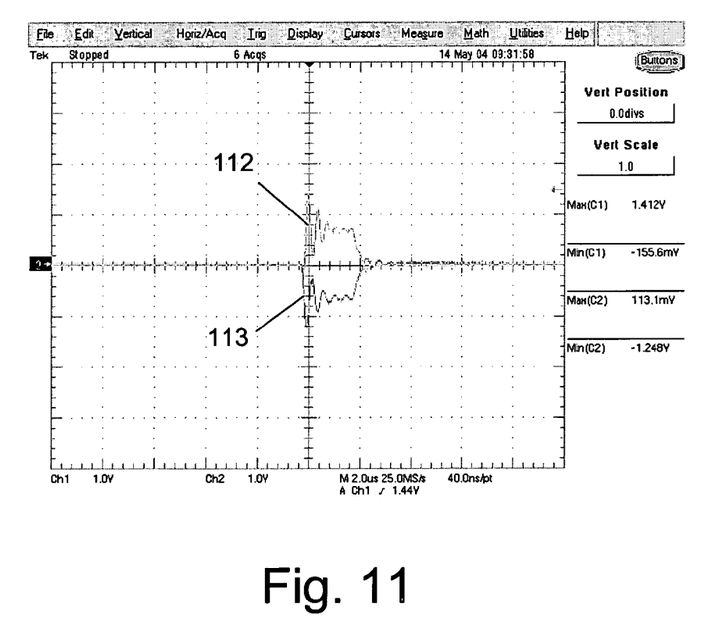
Figure 12:
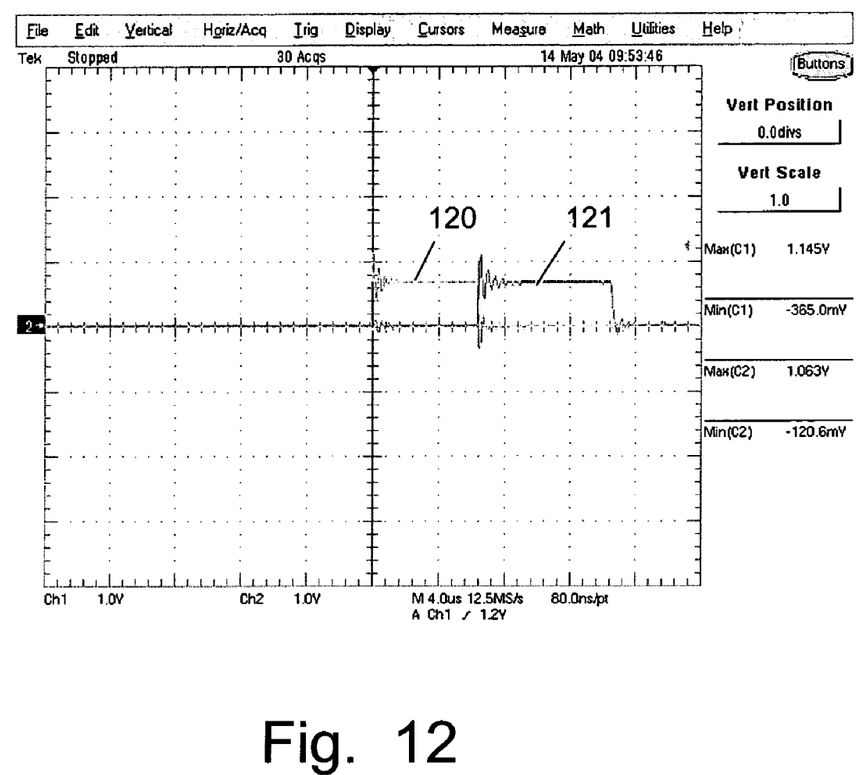

FIG. 11 shows motor line-to-line peak voltages 112 and 113 ($V_{u\_w}$ and $V_{v\_w}$) with the low speed reflected wave mitigation code disabled ($V_{dc}$ bus=684 volts). FIG. 12 shows motor line-to-line peak voltages 120 and 121 ($V_{u\_w}$ and $V_{v\_w}$) with the low speed reflected wave mitigation code enabled. When the reflected wave mitigation routine is enabled, a six-microsecond separation between gate pulses is enforced. This time interval was developed from testing a particular embodiment of a drive, a motor and the wiring connecting the drive to the motor. The time interval could be different for different configurations of these three elements.

Testing showed a decrease of more than 300 volts peak at the motor when the minimum time interval was enforced at low motor speeds. Specifically the motor peak voltage dropped from over 1850 volts to less than 1550 volts with a 725 volt bus.

The present invention provides a reflected wave mitigation via pulse elimination program routine that implements a minimum time interval between gate pulses. This time interval allows motor voltage ringing associated with a first power transistor (IGBT) gate pulse to decay before another phase switching is allowed. This prevents an IGBT gate pulse arriving at peak motor terminal voltage. Motor voltages resulting from IGBT gate pulses become additive often exceeding two times source voltage, however, by enforcing a minimum time interval, greater than two times source voltage can be effectively controlled to a value approximately equal to twice source voltage. The program routine (FIG. 9) also reduces or mitigates the effects of inverter induced polarity reversals, which is an inverter driven event occurring most often when at least two modulating signals intersect as a function in time.

This has been a description of several preferred embodiments of the invention. It will be apparent that various modifications and details can be varied without departing from the scope and spirit of the invention, and these are intended to come within the scope of the following claims.

We claim:

1. A method of controlling switching in a DC-to-AC inverter to prevent overvoltages applied to an AC motor by requiring a minimum time interval between gating signals that are produced in response to phase voltage signals, the method comprising:
   determining the switching order of the phase voltage signals;
   providing gating signals at switching intervals by modulating a carrier wave with the phase voltage signals;
   comparing the switching intervals to a predetermined minimum time interval sufficient for reflected wave transients to dissipate; and
   adjusting the switching intervals to be at least equal to the predetermined minimum time interval.

2. The method of claim 1, wherein the determining of the switching intervals, the comparing the switching intervals to the predetermined minimum time interval and adjusting the switching to be at least equal to the predetermined minimum time interval is performed by a microelectronic CPU under control of a stored program routine.

3. The method of claim 1, wherein before determining the switching order of the phase voltage signals, and before determining switching intervals between the gating signals, there is a determination of whether the inverter is operating in a pulse dropping region of operation.

4. The method of claim 1, wherein adjusting the switching intervals between the gating signals further comprises advancing a first one of the gating signals relative to a second one of the gating signals and delaying a third one of the gating signals to provide minimum time intervals between each pair of the gating signals.

5. The method of claim 1, wherein adjusting the time intervals between the gating signals further comprises advancing a first one of the gating signals and delaying a second one of the gating signals to provide minimum time intervals between the gating signals while maintaining the minimum time interval between the second one of the gating signals and a third one of the gating signals.

6. The method of claim 1, wherein adjusting the time intervals between the gating signals further comprises maintaining a minimum time interval between a first one of the gating signals and a second one of the gating signals and advancing the second one of the gating signals and delaying a third one of the gating signals to provide a minimum time interval between the second one of the gating signals and the third one of the gating signals.

7. The method of claim 1, wherein the minimum time interval is at least six microseconds.

8. The method of claim 1, wherein the minimum time interval is greater than an ordinary dead band required to prevent voltage pulsing between switching events.

9. A controller for providing gating signals at time intervals to switches in a DC-to-AC inverter by modulating a carrier wave with phase voltage signals, the controller preventing overvoltages by requiring a time interval between gating signals, the controller having a CPU executing a control program having a first portion for determining a switching order of the phase voltage signals, the CPU executing a second portion of the control program for comparing the time intervals to a predetermined minimum time interval sufficient for reflected wave transients to dissipate, and the CPU executing a third portion of the control program for adjusting the time intervals between respective pairs of the gating signals to be at least equal to the predetermined minimum time interval.

10. The controller of claim 9, wherein before determining the switching order of the phase voltage signals, and before determining switching intervals between the gating signals, the CPU executes at least one program instruction to determine whether the inverter is operating in a pulse dropping region of operation.

11. The controller of claim 9, wherein in adjusting the switching intervals between the gating signals the CPU executes program instructions in the third portion of the control program for advancing a first one of the gating signals relative to a second one of the gating signals and for delaying a third one of the gating signals to provide minimum time intervals between each pair of the gating signals.

12. The controller of claim 9, wherein in adjusting the switching intervals between the gating signals the CPU executes program instructions in the third portion of the control program for advancing a first one of the gating signals and for delaying a second one of the gating signals to provide minimum time intervals between the gating signals while maintaining the minimum time interval between the second one of the gating signals and a third one of the gating signals.

13. The controller of claim 9, wherein in adjusting the switching intervals between the gating signals, the CPU executes program instructions in the third portion of the control program for maintaining a minimum time interval between a first one of the gating signals and a second one of the gating signals while advancing the second one of the gating signals and delaying a third one of the gating signals to provide the a minimum time interval between the second one of the gating signals and the third one of the gating signals.

14. The controller of claim 9, wherein the minimum time interval is at least six microseconds.

15. The controller of claim 9, wherein the minimum time interval is greater than an ordinary dead band required to prevent voltage pulsing between switching events.

* * * * *

UNITED STATES PATENT AND TRADEMARK OFFICE
CERTIFICATE OF CORRECTION

PATENT NO. : 7,034,501 B1
APPLICATION NO. : 11/068351
DATED : April 25, 2006
INVENTOR(S) : Thunes et al.

It is certified that error appears in the above-identified patent and that said Letters Patent is hereby corrected as shown below:

Column 5, line 37, "$V_{v\_ref}$" should be -- $V_{w\_ref}$ --.

Column 8, claim 7, line 8, "six" should be --fifteen--.

Column 8, claim 9, line 14, "with phase" should be --with the phase--.

Column 8, claim 9, line 18, "a switching" should be --the switching--.

Column 8, claim 13, line 49, "The controller" should be --The method--.

Column 8, claim 14, line 59, "The controller" should be --The method--.

Column 8, claim 15, line 61, "The controller" should be --The method--.

Signed and Sealed this

Twenty-eighth Day of November, 2006

JON W. DUDAS
*Director of the United States Patent and Trademark Office*